United States Patent
Raghunath et al.

(10) Patent No.: US 10,659,532 B2
(45) Date of Patent: May 19, 2020

(54) TECHNOLOGIES FOR REDUCING LATENCY VARIATION OF STORED DATA OBJECT REQUESTS

(71) Applicants: Arun Raghunath, Beaverton, OR (US); Michael P. Mesnier, Scappoose, OR (US)

(72) Inventors: Arun Raghunath, Beaverton, OR (US); Michael P. Mesnier, Scappoose, OR (US)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 14/866,893

(22) Filed: Sep. 26, 2015

(65) Prior Publication Data

US 2017/0093976 A1 Mar. 30, 2017

(51) Int. Cl.
*H04L 29/08* (2006.01)
*H04L 12/26* (2006.01)

(52) U.S. Cl.
CPC ...... *H04L 67/1097* (2013.01); *H04L 43/0852* (2013.01); *H04L 43/0876* (2013.01); *H04L 67/28* (2013.01)

(58) Field of Classification Search
CPC ........... G06F 2201/87; G06F 2201/885; G06F 9/5083; G06F 3/064; G06F 3/0689; H04L 67/1097; H04L 67/28; H04L 43/0852; H04L 67/1063
See application file for complete search history.

(56) References Cited

U.S. PATENT DOCUMENTS 8,572,622 B2 * 10/2013 Alexander ............ G06F 9/5066
718/104
8,706,802 B1 4/2014 Dayan
(Continued)

FOREIGN PATENT DOCUMENTS

WO 2015-016907 2/2015

OTHER PUBLICATIONS

International Search Report for PCT/US16/048850, dated Nov. 24, 2016 (3 pages).
(Continued)

*Primary Examiner* — Kevin T Bates
*Assistant Examiner* — Ranjan Pant
(74) *Attorney, Agent, or Firm* — Barnes & Thornburg LLP

(57) ABSTRACT

Technologies for reducing latency variation of stored data object requests include a proxy computing node communicatively coupled to a plurality of storage nodes. The proxy computing node is configured to determine whether to chunk a data object corresponding to a data object request received by the proxy computing node. Accordingly, the proxy computing node is configured to obtain a retrieval latency of the storage node and determine whether to chunk the data object based on the retrieval latency. The proxy computing node is further configured to, subsequent to a determination to chunk the data object, determine a chunk size (i.e., a portion of the data object) to be retrieved from the storage node and a remaining size of the data object at the storage node after the portion of the data object corresponding to the chunk request is received. Other embodiments are described and claimed.

19 Claims, 7 Drawing Sheets

(56) References Cited

U.S. PATENT DOCUMENTS

| | | | | |
|---|---|---|---|---|
| 2003/0195940 A1* | 10/2003 | Basu | G06F 16/9574 | 709/213 |
| 2004/0073724 A1* | 4/2004 | Wilson | H04L 49/90 | 710/52 |
| 2008/0120459 A1* | 5/2008 | Kaneda | G06F 11/1451 | 711/112 |
| 2008/0133767 A1* | 6/2008 | Birrer | H04L 65/4076 | 709/231 |
| 2009/0138570 A1* | 5/2009 | Miura | G06F 13/1673 | 709/217 |
| 2010/0106816 A1* | 4/2010 | Gulati | H04L 67/1097 | 709/223 |
| 2010/0318632 A1* | 12/2010 | Yoo | H04L 65/605 | 709/219 |
| 2011/0066767 A1* | 3/2011 | Hyde, II | G06F 3/0613 | 710/18 |
| 2011/0161976 A1* | 6/2011 | Alexander | G06F 9/5066 | 718/104 |
| 2011/0295948 A1* | 12/2011 | Rao | H04L 9/3236 | 709/203 |
| 2012/0102009 A1* | 4/2012 | Peterson | G06F 16/10 | 707/705 |
| 2013/0212349 A1* | 8/2013 | Maruyama | G06F 12/00 | 711/167 |
| 2014/0089735 A1* | 3/2014 | Barrett | G06F 11/3495 | 714/27 |
| 2014/0181332 A1* | 6/2014 | Wang | G06F 11/3037 | 710/15 |
| 2014/0281161 A1* | 9/2014 | Chen | G06F 12/0246 | 711/103 |
| 2014/0379921 A1* | 12/2014 | Morley | H04L 67/10 | 709/226 |
| 2015/0039792 A1 | 2/2015 | Spry | | |
| 2015/0043347 A1* | 2/2015 | Ng | H04M 15/8016 | 370/235 |
| 2015/0199388 A1* | 7/2015 | Hrischuk | G06F 16/21 | 707/802 |
| 2015/0207846 A1* | 7/2015 | Famaey | H04L 67/02 | 709/219 |
| 2016/0062834 A1* | 3/2016 | Benight | G06F 16/22 | 714/766 |
| 2016/0094649 A1* | 3/2016 | Dornquast | G06F 16/178 | 709/227 |
| 2016/0156948 A1* | 6/2016 | Yang | H04N 21/234309 | 725/116 |
| 2016/0266801 A1* | 9/2016 | Marcelin Jemenez | G06F 3/0604 | |
| 2016/0357443 A1* | 12/2016 | Li | G06F 3/065 | |
| 2016/0378624 A1* | 12/2016 | Jenkins, Jr. | G06F 11/1076 | 714/6.3 |

OTHER PUBLICATIONS

Written Opinion for PCT/US16/048850, dated Nov. 24, 2016 (8 pages).

\* cited by examiner

US 10,659,532 B2

TECHNOLOGIES FOR REDUCING LATENCY VARIATION OF STORED DATA OBJECT REQUESTS

BACKGROUND

Distributed data object storage clusters typically utilize a plurality of storage nodes (i.e., computing devices capable of storing a plurality of data objects) to provide enhanced performance and availability. Such storage clusters can be used for data object replication (i.e., data object redundancy/backup), for example. Generally, the storage clusters are not visible to a client computing device that is either transmitting data objects to be stored on the storage nodes or receiving stored data objects from the storage nodes. Accordingly, incoming requests (e.g., network packets including data objects or data object requests) are typically queued at an entry point of the storage cluster, commonly referred to as a proxy (e.g., a proxy server). As such, the proxy may be a computing device that is configured to act as an intermediary for the incoming client requests. Additionally, the proxy computing node can be configured to select which storage node to retrieve the requested data object from.

However, variable latency attributable to accessing data objects from a distributed cluster of storage nodes can occur when a request for a data object of smaller size is queued behind a request for a data object having a considerably larger size, which is commonly referred to as head-of-line blocking. Typically, the small data object request would be serviced quickly, due to its smaller size, but the latency of servicing the large data object request is added to the latency of the small data object request when the small data object request is queued behind the larger data object request. Accordingly, latency attributable to the amount of time to service the requests can vary widely across the storage nodes.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
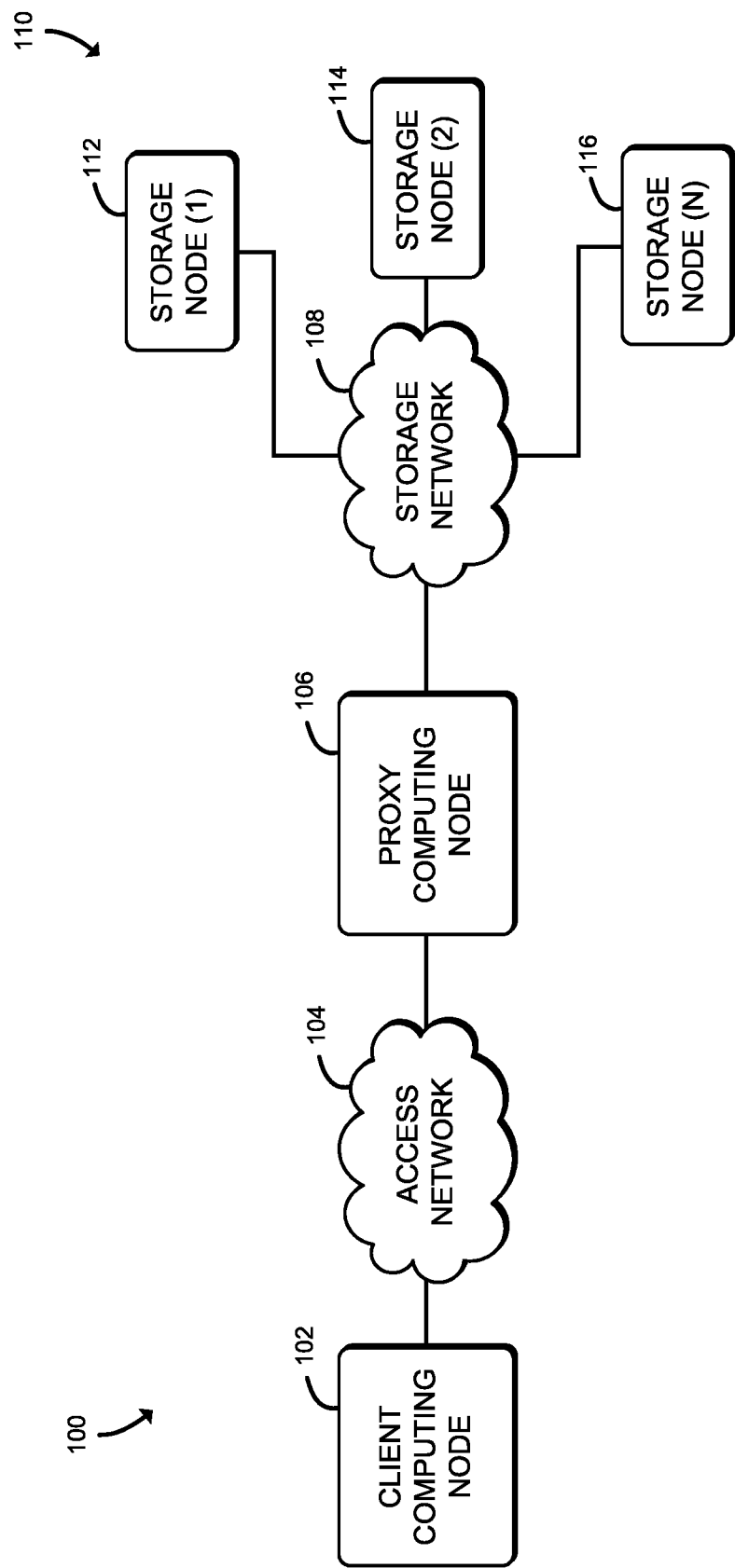
FIG. 1 is a simplified block diagram of at least one embodiment of a system for managing data object requests that includes a proxy computing node communicatively coupled to a storage node cluster.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for managing data object requests includes a client computing node 102 communicatively coupled to a proxy computing node 106 via an access network 104. As shown, the proxy computing node 106 is further communicatively coupled to a cluster of storage nodes 110 via a storage network 108. As will be described in further detail below, the storage nodes 110 includes a plurality of storage nodes (see, e.g., storage node (1) 112, storage node (2) 114, and storage node (n) 116) capable of storing data objects (e.g., replicas of the data objects for providing redundant backup) amongst two or more of the storage nodes 110.

In use, the proxy computing node 106 maintains a queue of data object requests (i.e., a data object request queue) received by the proxy computing node 106 for each of the storage nodes 110. Additionally, the proxy computing node 106 is configured to maintain various exponentially weighted latency values usable to determine whether to chunk a data object of each of the data object requests in the queue (i.e., in order to divide or separate the data object into smaller objects using multiple requests of smaller size than the original size of the data object). The exponentially weighted moving values include a per-byte-latency and a recent request latency. The proxy computing node 106 calculates the per-byte-latency as a function of a request completion time, a data object size (e.g., in bytes), a configurable weighted value (e.g., a value between 0 and 1), as well as a most previously calculated per-byte-latency. The proxy computing node 106 calculates the recent request latency as a function of the request completion time, the configurable weighted value, and a most previously calculated recent request latency. Accordingly, the proxy computing node 106 is configured to determine whether to chunk a data object of a data object request in the queue as a function of each of the per-byte-latency and recent request latency. For example, the function of each of the per-byte-latency and recent request latency may result in a chunk size that is compared by the proxy computing node 106 to a size of the data object of the data object request to determine whether to chunk (i.e., request only a portion of the data object equal to the chunk size) the requested data object.

Each of the access network 104 and the storage network 108 may be embodied as any type of wired and/or wireless communication network, including cellular networks, such as Global System for Mobile Communications (GSM) or Long-Term Evolution (LTE), telephony networks, digital subscriber line (DSL) networks, cable networks, local or wide area networks (LANs/WANs), global networks (e.g., the Internet), or any combination thereof. It should be appreciated that the access network 104 and/or the storage network 108 may serve as a centralized network and, in some embodiments, may be communicatively coupled to another network (e.g., the Internet). Accordingly, the access network 104 and/or the storage network 108 may include a variety of network devices (not shown), virtual and physical, such as routers, switches, network hubs, servers, storage devices, compute devices, etc., as needed to facilitate communication between the client computing node 102 and the proxy computing node 106 via the access network 104, as well as between the proxy computing node 106 and the cluster of storage nodes 110 via the storage network 108.

Figure 2:
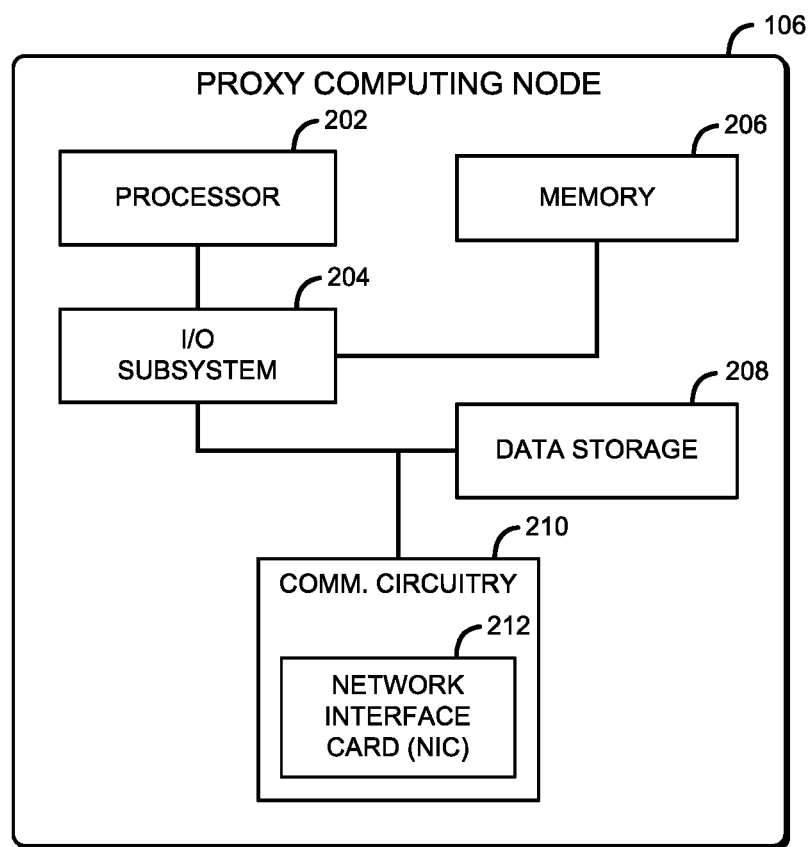
FIG. 2 is a simplified block diagram of at least one embodiment of the proxy computing node of the system of FIG. 1.

The proxy computing node 106 may be embodied as any type of computing device that is capable of performing the functions described herein, such as, without limitation, a rack-mounted switch, a standalone switch, a fully managed switch, a partially managed switch, a full-duplex and/or half-duplex communication mode enabled switch, etc. As shown in FIG. 2, the illustrative proxy computing node 106 includes a processor 202, an input/output (I/O) subsystem 204, a memory 206, a data storage device 208, and communication circuitry 210. Of course, the proxy computing node 106 may include other or additional components, such as those commonly found in a computing device (e.g., one or more input/output peripheral devices), in other embodiments. Additionally, in some embodiments, one or more of the illustrative components may be incorporated in, or otherwise form a portion of, another component. For example, the memory 206, or portions thereof, may be incorporated in the processor 202 in some embodiments. Further, in some embodiments, one or more of the illustrative components may be omitted from the proxy computing node 106.

The processor 202 may be embodied as any type of processor capable of performing the functions described herein. For example, the processor 202 may be embodied as a single or multi-core processor(s), digital signal processor, microcontroller, or other processor or processing/controlling circuit. Similarly, the memory 206 may be embodied as any type of volatile or non-volatile memory or data storage capable of performing the functions described herein. In operation, the memory 206 may store various data and software used during operation of the proxy computing node 106, such as operating systems, applications, programs, libraries, and drivers. The memory 206 is communicatively coupled to the processor 202 via the I/O subsystem 204, which may be embodied as circuitry and/or components to facilitate input/output operations with the processor 202, the memory 206, and other components of the proxy computing node 106. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and other components of the proxy computing node 106, on a single integrated circuit chip.

The data storage device 208 may be embodied as any type of device or devices configured for short-term or long-term storage of data such as, for example, memory devices and circuits, memory cards, hard disk drives, solid-state drives, or other data storage devices. It should be appreciated that the data storage device 208 and/or the memory 206 (e.g., the computer-readable storage media) may store various data as described herein, including operating systems, applications, programs, libraries, drivers, instructions, etc., capable of being executed by a processor (e.g., the processor 202) of the proxy computing node 106.

The communication circuitry 210 may be embodied as any communication circuit, device, or collection thereof, capable of enabling communications between the proxy computing node 106 and other computing devices (e.g., the client computing node 102, the storage nodes 110, etc.) over a network (e.g., the access network 104 and/or the storage network 108). The communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The illustrative communication circuitry 210 includes a network interface controller (NIC) 212. The NIC 212 may be embodied as one or more add-in-boards, daughtercards, network interface cards, controller chips, chipsets, or other devices that may be used by the proxy computing node 106. For example, in some embodiments, the NIC 212 may be integrated with the processor 202, embodied as an expansion card coupled to the I/O subsystem 204 over an expansion bus (e.g., PCI Express), part of an SoC that includes one or more processors, or included on a multichip package that also contains one or more processors.

Alternatively, in some embodiments, the NIC 212 may include a local processor (not shown) and/or a local memory (not shown) that are both local to the NIC 212. In such embodiments, the local processor of the NIC 212 may be capable of performing the offloaded functions (e.g., replication, network packet processing, etc.) as described herein. Additionally or alternatively, in such embodiments, the local memory of the NIC 212 may be capable of storing data local to the NIC 212. Additionally or alternatively, in some embodiments, functionality of the NIC 212 may be integrated into one or more components of the proxy computing node 106 at the board level, socket level, chip level, and/or other levels.

Referring again to FIG. 1, the client computing node 102 may be embodied as any type of computation or computing device capable of performing the functions described herein, including, without limitation, a computer, a mobile computing device (e.g., smartphone, tablet, laptop, notebook, wearable, etc.), a server (e.g., stand-alone, rack-mounted, blade, etc.), a network appliance (e.g., physical or virtual), a web appliance, a distributed computing system, a processor-based system, and/or a multiprocessor system. Similar to the illustrative proxy computing node 106 of FIG. 2, the client computing node 102 may include a processor, an I/O subsystem, a memory, a data storage device, and/or communication circuitry, which are not shown for clarity of the description. As such, further descriptions of the like components are not repeated herein with the understanding that the description of the corresponding components provided above in regard to the proxy computing node 106 applies equally to the corresponding components of the client computing node 102.

The illustrative cluster of storage nodes 110 includes a first storage node, which is designated as storage node (1) 112, a second storage node, which is designated as storage node (2) 114, and a third storage node, which is designated as storage node (N) 116 (i.e., the "Nth" storage node of the cluster of storage nodes 110, wherein "N" is a positive integer and designates one or more additional storage nodes). Each of the storage nodes 110 may be embodied as any type of storage device capable of performing the functions described herein, including, without limitation, a server (e.g., stand-alone, rack-mounted, blade, etc.), a network appliance (e.g., physical or virtual), a high-performance computing device, a web appliance, a distributed computing system, a computer, a processor-based system, and/or a multiprocessor system. As such, similar to the illustrative proxy computing node 106 of FIG. 2, each of the storage nodes 110 may include a processor, an I/O subsystem, a memory, a data storage device, and/or communication circuitry, which are not shown for clarity of the description. Accordingly, further descriptions of the like components are not repeated herein with the understanding that the description of the corresponding components provided above in regard to the proxy computing node 106 applies equally to the corresponding components of each of the storage nodes 110.

Figure 3:
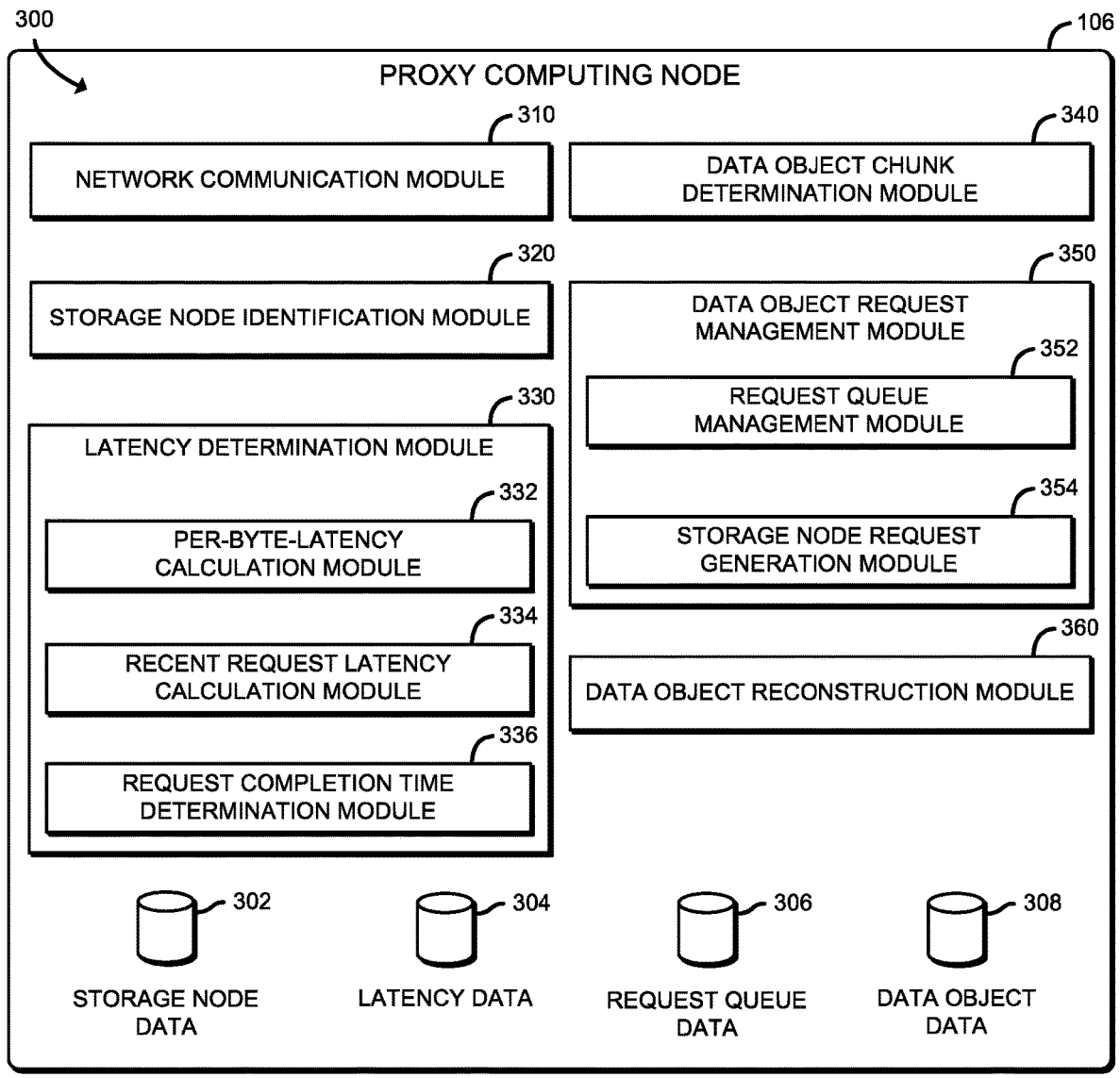
FIG. 3 is a simplified block diagram of at least one embodiment of an environment that may be established by the proxy computing node of FIGS. 1 and 2.

Referring now to FIG. 3, in an illustrative embodiment, the proxy computing node 106 establishes an environment 300 during operation. The illustrative environment 300 includes a network communication module 310, a storage node identification module 320, a latency determination module 330, a data object chunk determination module 340, a data object request management module 350, and a data object reconstruction module 360. Each of the modules, logic, and other components of the environment 300 may be embodied as hardware, software, firmware, or a combination thereof. For example, each of the modules, logic, and other components of the environment 300 may form a portion of, or otherwise be established by, the processor 202, the communication circuitry 210 (e.g., the NIC 212), and/or other hardware components of the proxy computing node 106. As such, in some embodiments, one or more of the modules of the environment 300 may be embodied as circuitry or a collection of electrical devices (e.g., network communication circuitry 310, storage node identification circuitry 320, latency determination circuitry 330, data object chunk determination circuitry 340, data object request management circuitry 350, data object reconstruction circuitry 360, etc.).

In the illustrative environment 300, the proxy computing node 106 includes storage node data 302, latency data 304, request queue data 306, and data object data 308, each of which may be accessed by the various modules and/or sub-modules of the proxy computing node 106. It should be appreciated that the proxy computing node 106 may include other components, sub-components, modules, sub-modules, and/or devices commonly found in a computing node, which are not illustrated in FIG. 3 for clarity of the description.

The network communication module 310 is configured to facilitate inbound and outbound network communications (e.g., network traffic, network packets, network flows, etc.) to and from the proxy computing node 106. To do so, the network communication module 310 is configured to receive and process network packets from other computing devices (e.g., the client computing node 102, the storage nodes 110, and/or other computing device(s) communicatively coupled via the access network 104 and/or the storage network 108). Additionally, the network communication module 310 is configured to prepare and transmit network packets to another computing device (e.g., the client computing node 102, the storage nodes 110, and/or other computing device (s) communicatively coupled via the access network 104 and/or the storage network 108). Accordingly, in some embodiments, at least a portion of the functionality of the network communication module 310 may be performed by the communication circuitry 210, and more specifically by the NIC 212.

The storage node identification module 320 is configured to identify which storage node of the storage nodes is presently storing a data object of a data object request received (i.e., a network packet that includes the data object request) by the proxy computing device 106. To do so, the storage node identification module 320 may be configured to retrieve an identifier (e.g., a source internet protocol (IP) address, a destination IP address, a source network port, a destination network port, a dynamic host configuration protocol (DHCP) address, a protocol, a flow, etc.) of the data object request, such as from parsing a header of the network packet that included the data object request.

Accordingly, the storage node identification module 320 may use the identifier (e.g., by performing a tuple match against a mapping table) to determine which of the storage nodes is presently storing the requested data object. In some embodiments, data characteristic of the storage nodes 110 (e.g., an IP address) may be stored in the storage node data 302. It should be appreciated that additionally operations may be performed on the identifier by the storage node identification module 320 to determine the storage nodes. For example, a hash of the identifier may be calculated and at least a portion of the result may be used to generate an index for a location of information of the storage nodes. For example, the index may be an index into a consistent hash ring, the region corresponding to the index of which may include an identifier into another structure, such as map that partitions the storage devices on which the data object has been stored.

The latency determination module 330 is configured to determine a retrieval latency corresponding to the storage node identified as presently storing the data object of the data object request. In some embodiments, the retrieval latencies of each of the storage nodes 110 may be stored in the latency data 304. Additionally or alternatively, in some embodiments, the identified storage node may be provided by the storage node identification module 320. As described further below, the retrieval latency is indicative of a temporal latency for retrieving data from the identified storage node. To obtain the retrieval latency, the latency determination module 330 includes a recent request latency calculation module 332, a per-byte-latency calculation module 334, and a request completion timer determination module 336.

The per-byte-latency calculation module 332 is configured to calculate the per-byte-latency as a function of a weighted parameter, a request completion time of a particular one of the storage nodes 110, a total size of the data object corresponding to the data object request, and a last calculated per-byte-latency (i.e., the most recently calculated per-byte-latency) that particular one of the storage nodes 110. The weighted parameter defines a value between 0 and 1 that is configured to adjust an influence of previously calculated request latencies. For example, to calculate the per-byte-latency for a storage node, the per-byte-latency calculation module 332 may be configured to perform the following equation:

$$PBL_{present} = (1-W)*PBL_{last} + W*\left(\frac{\text{Request Completion Time}}{\text{Object Size}}\right) \quad \text{Equation 1}$$

wherein $PBL_{present}$ is the present per-byte-latency, W is the weighted parameter having a value between 0 and 1, $PBL_{last}$ is the last calculated per-byte-latency, Request Completion Time is the request completion time of the storage node, and Object Size is the size of the data object corresponding to the data object request presently being analyzed.

The recent request latency calculation module 334 is configured to calculate the recent request latency for the data object request as a function of the previously described weighted parameter, the request completion time of a particular one of the storage nodes 110, and a last calculated recent request latency (i.e., the most recently calculated recent request latency) of that particular one of the storage nodes 110. For example, to calculate the recent request latency for a storage node, the recent request latency calculation module 334 may be configured to perform the following equation:

$$RRL_{present}=(1-W)*RRL_{last}+W*(\text{Request Completion Time}) \quad \text{Equation 2}$$

wherein $RRL_{present}$ is the present recent request latency, W is the weighted parameter having a value between 0 and 1, $RRL_{last}$ is the last calculated recent request latency, and Request Completion Time is the request completion time of the storage node.

The request completion time determination module 336 is configured to determine a request completion time of a particular one of the storage nodes 110. To do so, the request completion time determination module 336 may be configured to determine the request completion time based on a duration of time between having transmitted the chunk request and having received the requested chunk. In some embodiments, to determine the duration of time, the latency determination module 330 may be configured to manage a timer, or clock, of the proxy computing node 106 and base the duration of time to complete one or more previous data object requests (i.e., transmit the data object request and receive the requested data object).

It should be appreciated that, in some embodiments, the latency determination module 330 may be configured to use additional and/or alternative models for chunking a large data object into a plurality of smaller data objects (i.e., via multiple data object request each of which requesting the smaller data objects). For example, in such embodiments, the latency determination module 330 may be configured to determine the retrieval latency based on one or more of the type of data object, an amount of outstanding work associated with retrieving the object, and/or other telemetry of the platform.

The data object chunk determination module 340 is configured to retrieve the per-byte-latency and recent request latency for a storage node to determine whether to chunk the requested data object. To do so, data object chunk determination module 340 is configured to compare the retrieved per-byte-latency against the retrieved recent request latency. For example, the data object chunk determination module 340 may be configured to compare a product of the per-byte-latency and a size of the data object requested against a product of the recent request latency a chunk trigger. The chunk trigger defines a threshold (e.g., a number of orders of magnitude) of size to multiply the recent request latency against. In some embodiments, the chunk trigger may be a variable (i.e., configurable) parameter.

Additionally, subsequent to a determination to chunk the requested data object (i.e., only request a portion of the total size of the data object), the data object chunk determination module 340 is further configured to determine a chunk size of the data object (i.e., the portion of the total size of the data object) and a remainder size of the data object. To determine the chunk size of the data object, the data object chunk determination module 340 is configured to determine the chunk size as a function of the retrieved per-byte-latency and recent request latency. For example, the data object chunk determination module 340 may be configured to determine the chunk size by dividing the recent request latency by the per-byte-latency (i.e., (RRL/PBL), wherein RRL is the recent request latency and PBL is the per-byte-latency).

To determine the remainder size of the data object, the data object chunk determination module 340 may be configured to determine the remainder size as a result of subtracting the chunk size from the size of the data object. In other words, the remainder size is equal to the remaining size of the data object after the chunk size was removed from the data object. It should be appreciated that the size of the data object corresponding to the data object request may be smaller than a total size of the data object corresponding to the data object request initially received. In other words, the data object request may be a result of remainder data object request from a previous iteration (e.g., a result of a previous determination to chunk the data object corresponding to the data object request initially received) that was created and added to the end of the request queue in the previous iteration.

The data object request management module 350 is configured to manage the data object requests. To do so, the data object request management module 350 includes a request queue management module 352 and a storage node request generation module 354. The request queue management module 352 is configured to manage a request queue of a number of data object requests for each of the storage nodes 110. Accordingly, the request queue management module 352 may be configured to push data object requests into the tail of the request queue and pop data object requests from the head of the request queue. The storage node request generation module 354 is configured to generate data object requests for each of the storage nodes 110, which may be queued by the request queue management module 352. In some embodiments, the request queue and the data object requests thereof may be stored in the request queue data 306.

The data object reconstruction module 360 is configured to reconstruct the chunks of data objects received by the proxy computing device. To do so, the data object reconstruction module 360 may be configured to associate each chunk with an originally requested data object. Accordingly, upon receiving every chunk of the originally requested data object, the data object reconstruction module 360 may then transfer reconstructed data object to the client computing node that requested the data object. Alternatively, upon receiving every chunk of the originally requested data object, the data object reconstruction module 360 may then transfer the chunks and a set of reconstruction instructions to the client computing node that requested the data object, such that the client computing node can perform the reconstruction.

Figure 4:
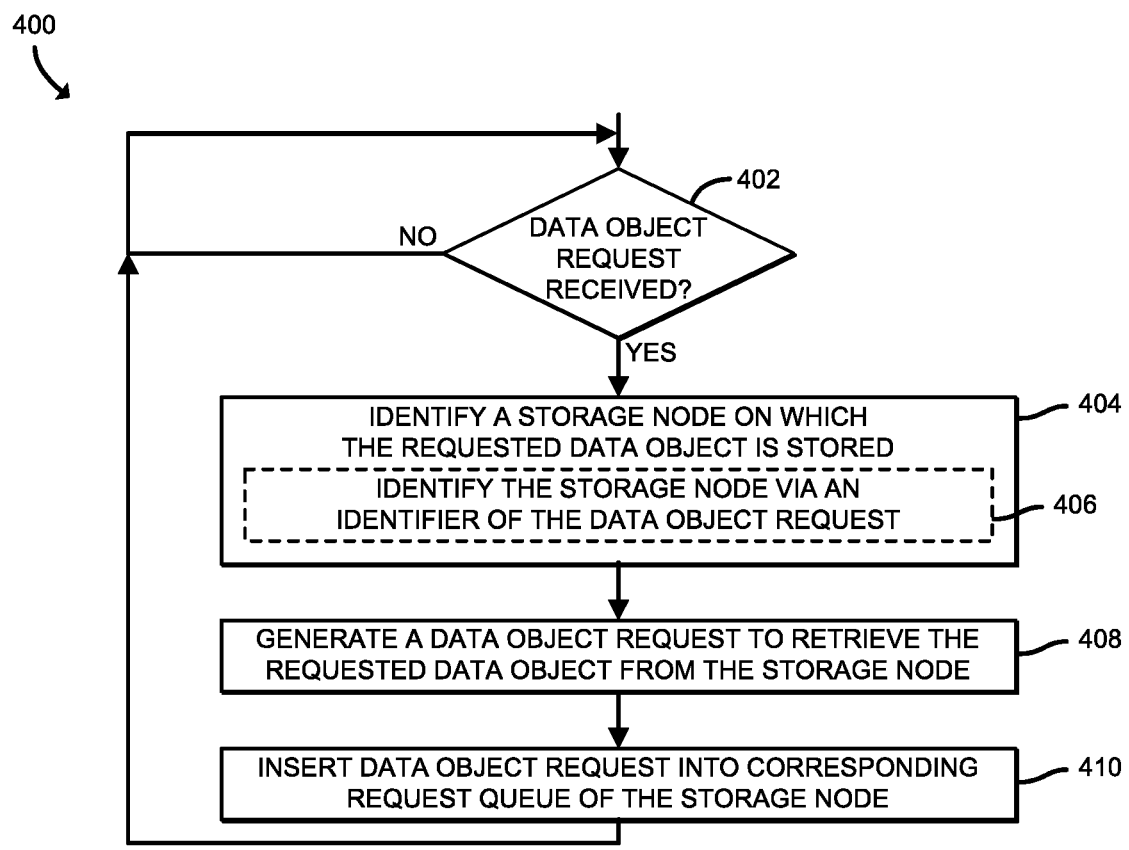
FIG. 4 is a simplified flow diagram of at least one embodiment of a method for queuing object requests that may be executed by the proxy computing node of FIGS. 1 and 2.

Referring now to FIG. 4, in use, the proxy computing node 106 may execute a method 400 for queuing object requests. It should be appreciated that at least a portion of the method 400 may be offloaded to and executed by the NIC 212 of the proxy computing node 106. It should be further appreciated that, in some embodiments, the method 400 may be embodied as various instructions stored on a computer-readable media, which may be executed by the processor 202, the NIC 212, and/or other components of the proxy computing node 106 to cause the proxy computing node 106 to perform the method 400. The computer-readable media may be embodied as any type of media capable of being read by the proxy computing node 106 including, but not limited to, the memory 206, the data storage device 208, a local memory of the NIC 212, other memory or data storage devices of the proxy computing node 106, portable media readable by a peripheral device of the proxy computing node 106, and/or other media.

The method 400 begins with block 402, in which the proxy computing node 106 determines whether a network packet that includes a data object request was received by the proxy computing node 106, such as from the client computing node 102. If the data object request was not received, the method 400 loops back to block 402 to continue to determine whether the data object request was received. Otherwise, if the data object request was received, the method 400 advances to block 404.

In block 404, the proxy computing node 106 identifies a storage node that corresponds to the storage node on which the requested data object is presently stored. In some embodiments, in block 406, the proxy computing node 106 identifies the storage node based on an identifier of the data object request. As described previously, the identifier may include any data indicative of an identifiable characteristic of a data object included in the network packet, such as a workload type, and/or an identifiable characteristic of the network packet that includes a data object request, such as, but not limited to, such as a source IP address, a destination IP address, a source network port, a destination network port, a DHCP address, a protocol, a flow, etc. In such embodiments, the identifier may be retrieved by parsing a header of the network packet that includes a data object request. In block 408, the proxy computing node 106 generates a data object request usable to retrieve the requested data object from the storage node identified in block 404. In block 410, the proxy computing node 106 inserts the data object request generated in block 408 into a corresponding request queue of the storage node identified in block 404.

Figure 5:
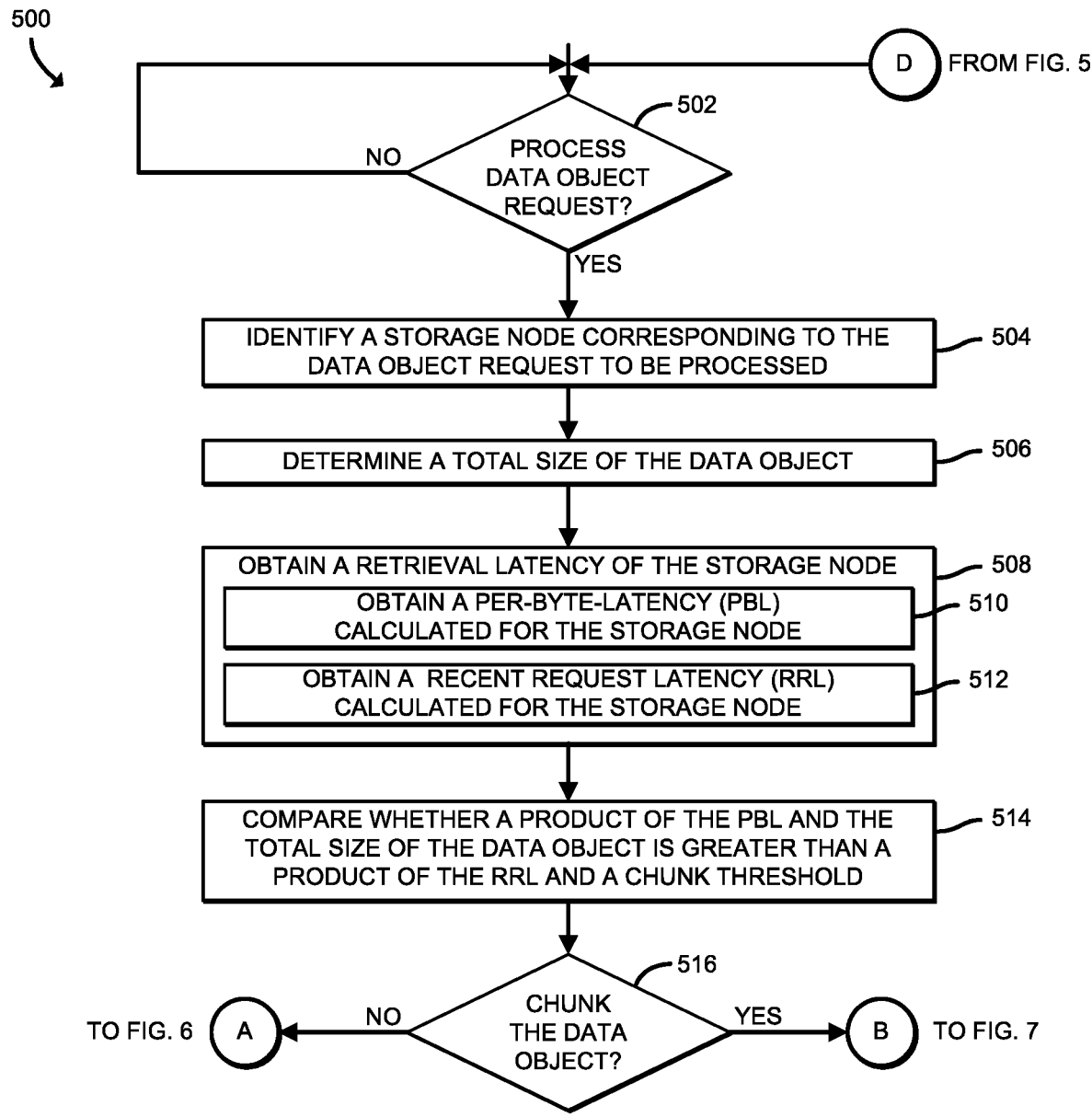
FIGS. 5-7 are a simplified flow diagram of at least one embodiment of a method for reducing latency variations of stored data object requests that may be executed by the proxy computing node of FIGS. 1 and 2.
Figure 6:
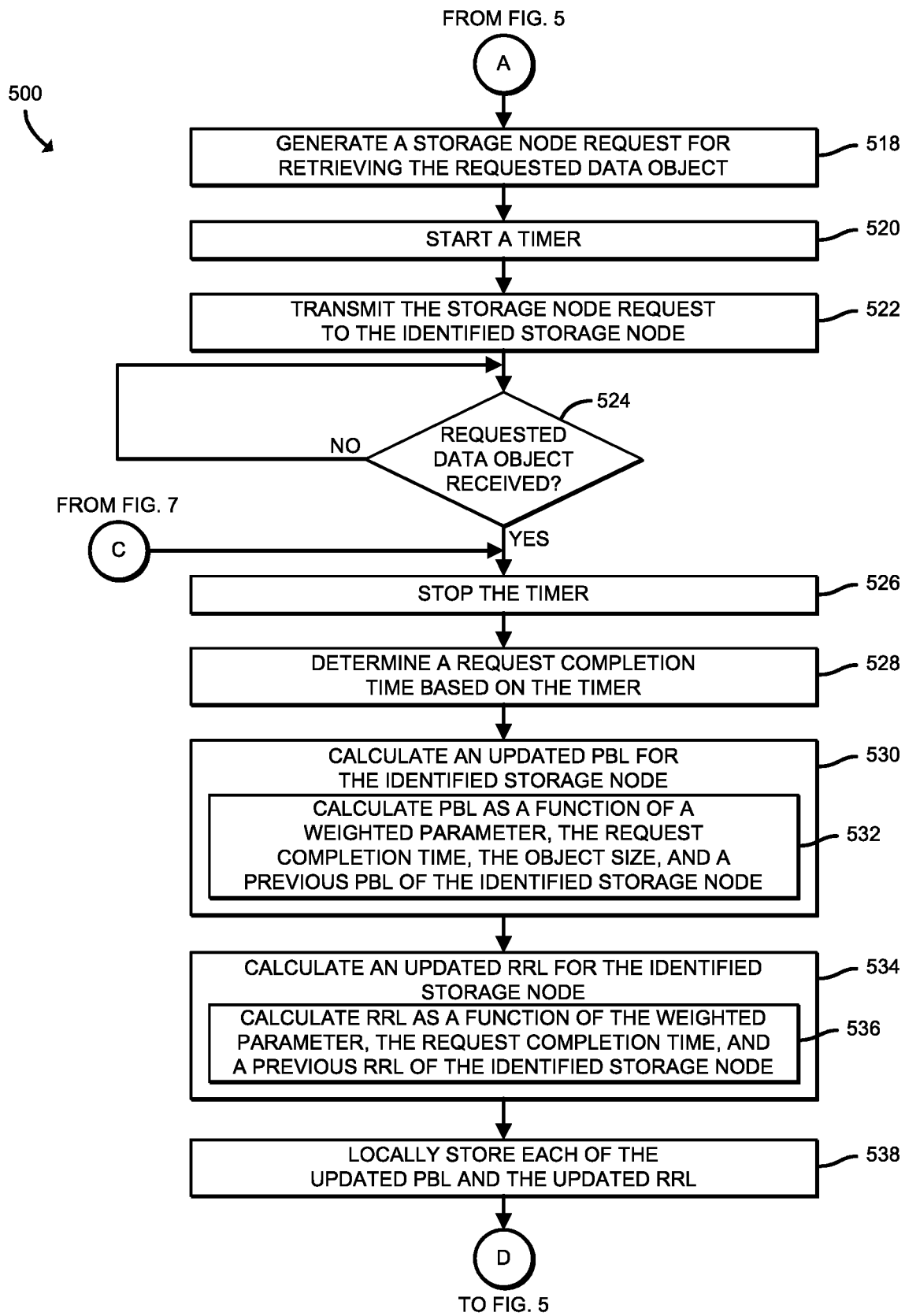
Figure 7:
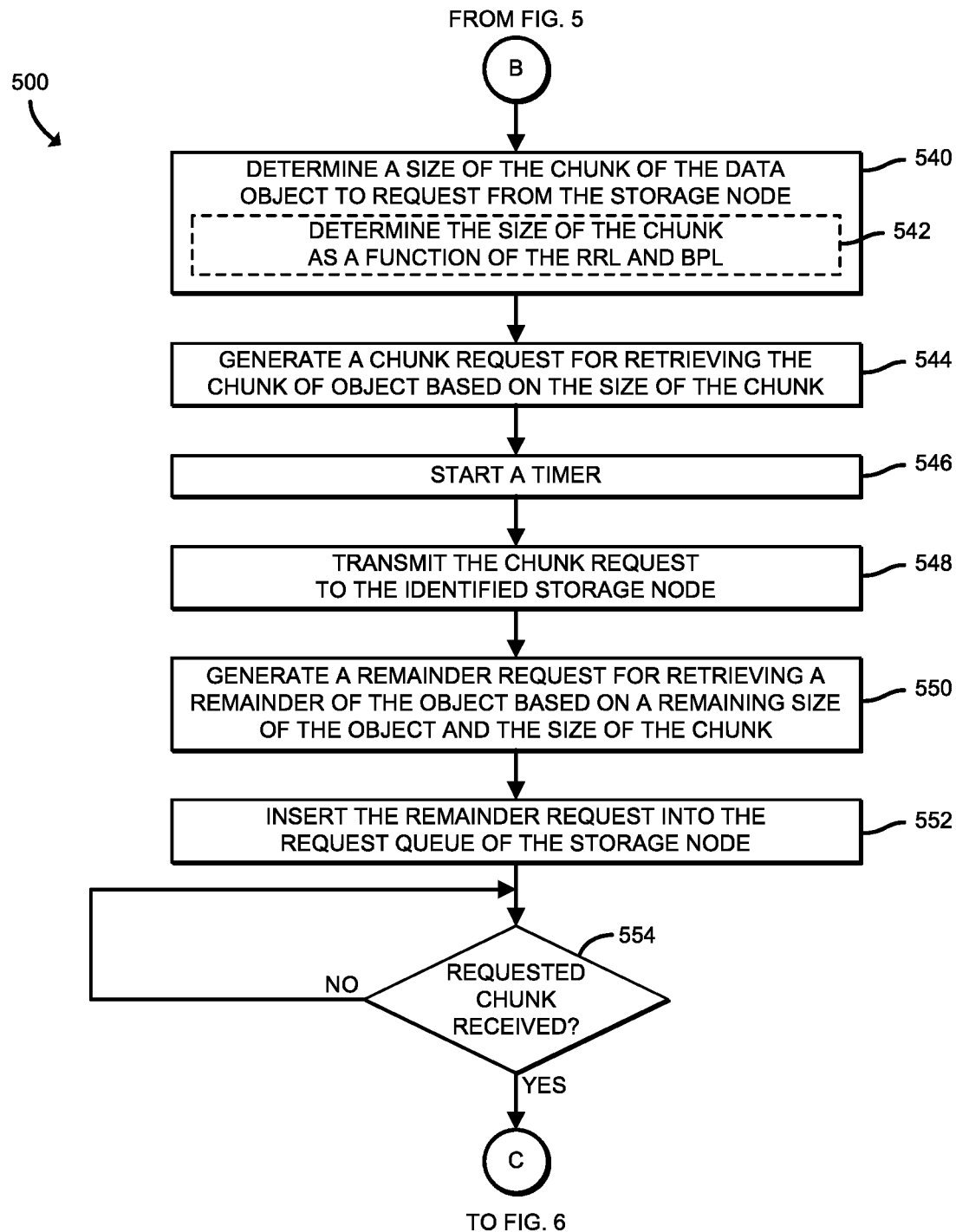

Referring now to FIGS. 5 through 7, in use, the proxy computing node 106 may execute a method 500 for reducing latency variations of stored data object requests. It should be appreciated that at least a portion of the method 500 may be offloaded to and executed by the NIC 212 of the proxy computing node 106. It should be further appreciated that, in some embodiments, the method 500 may be embodied as various instructions stored on a computer-readable media, which may be executed by the processor 202, the NIC 212, and/or other components of the proxy computing node 106 to cause the proxy computing node 106 to perform the method 500. The computer-readable media may be embodied as any type of media capable of being read by the proxy computing node 106 including, but not limited to, the memory 206, the data storage device 208, a local memory of the NIC 212, other memory or data storage devices of the proxy computing node 106, portable media readable by a peripheral device of the proxy computing node 106, and/or other media.

The method 500 begins with block 502, in which the proxy computing node 106 determines whether a data object request placed into the request queue have reached a head of the request queue and is available to be processed. In other words, the proxy computing node 106 determines whether the data object request is in a position in the request queue to be processed, such as at a head of the request queue. In block 504, the proxy computing node 106 identifies a storage node that corresponds to the data object request. In some embodiments, the proxy computing node 106 may identify the storage node based on an indication in the data object request to be processed. Alternatively, in some embodiments, the proxy computing node 106 may identify the storage node based on the identifier of the data object and/or network packet, as described previously.

In block 506, the proxy computing node 106 determines a total size of the data object corresponding to the data object request. It should be appreciated that the total size of the data object corresponding to the data object request may not be the same as a total size of the originally received data object request. For example, the data object request being processed may be from a previous iteration of the method 500 in which the data object of a previously processed data object request was chunked.

In block 508, the proxy computing node 106 obtains a retrieval latency of the storage node identified in block 504. To do so, in block 510, the proxy computing node 106 obtains a per-byte-latency calculated for the identified storage node. Additionally, in block 510, the proxy computing node 106 obtains a recent request latency calculated for the identified storage node. In block 514, the proxy computing node 106 compares whether a product of the per-byte-latency and the size of the data object corresponding to the data object request being processed is greater than a product of the recent request latency and a chunk trigger (i.e., a chunk threshold). As described previously, the chunk trigger defines a threshold that may be represented as a number of orders of magnitude (e.g., three orders of magnitude). In other words, the proxy computing node 106 determines whether issuing a request for the entire size of the data object would require a number of orders of magnitude more than the latency of recent data object requests.

In block 516, the proxy computing node 106 determines whether to chunk the data object based on the comparison performed at block 514. If the proxy computing node 106 determines to chunk the data object, the method 500 branches to block 540, which is described below in regard to FIG. 7.

Otherwise, if the proxy computing node 106 determines not to chunk the data object, the method advances to block 518 (see FIG. 6), wherein the proxy computing node 106 generates a storage node request for retrieving the requested data object from the storage node identified in block 504. In block 520, the proxy computing node 106 starts a timer, or reads a value of a clock, of the proxy computing node 106. In block 522, the proxy computing node 106 transmits the storage node request generated in block 518 to the corresponding storage node. In block 524, the proxy computing node 106 determines whether the requested data object corresponding to the storage node request was received. If not, the method 500 loops back to block 524 to continue to determine whether the requested data object corresponding to the storage node request was received. Otherwise, if the requested data object was received, the method 500 advances to block 526, wherein the requested data object stops the timer, or reads a value of the clock.

In block 528, the proxy computing node 106 determines a request completion time based on a value of the timer. It should be appreciated that, in such embodiments wherein timestamps from the clock are being read, such timestamps may be recorded and compared to determine the request completion time. In block 530, the proxy computing node 106 calculates an updated per-byte-latency. As described previously, in block 532, the per-byte-latency is calculated (see, e.g., Equation 1 above) as a function of a weighted parameter, a most recently calculated per-byte latency, a request completion time, and a size of the data object received in block 524.

In block 534, the proxy computing node 106 calculates an updated recent request latency. As also described previously, in block 536, the recent request latency is calculated (see, e.g., Equation 2 above) as a function of the weighted parameter, the request completion time, and a most recently calculated recent request latency. In block 538, each of the updated per-byte-latency calculated in block 530 and the updated recent request latency calculated in block 534 are stored local to the proxy computing node 106 such that each may be retrieved by a next iteration as the most recently calculated per-byte latency and the most recently calculated recent request latency, respectively. From block 534, the method 500 returns to block 502, wherein the proxy computing node 106 determines whether another data object request placed into the request queue has reached a head of the request queue and is available to be processed.

Referring again to block 516, as described previously, if the proxy computing node 106 determines to chunk the data object, the method 500 advances to block 540 as shown in FIG. 7. In block 540, the proxy computing node 106 determines a size of the data object to chunk off and request separately. In some embodiments, in block 542, the proxy computing node 106 determines the size of the chunk as a function of the recent request latency and the per-byte-latency. As described previously, the proxy computing node 106 determines the size of the chunk based on a result of the recent request latency divided by the per-byte-latency.

In block 544, the proxy computing node 106 generates a chunk request usable for retrieving the chunk of the object (i.e., a portion of the previously request data object) from the storage node identified in block 504. In block 546, the proxy computing node 106 starts a timer, or reads a value of a clock, of the proxy computing node 106. In block 548, the proxy computing node 106 transmits the chunk request to the storage node identified in block 504. In block 550, the proxy computing node 106 generates a remainder request for retrieving a remainder of the object. In other words, the proxy computing node 106 generates the remainder request for a remaining portion of the data object that results from the size of the data object of the data object request minus the chunk size. In block 552, the proxy computing node 106 inserts the remainder request into the request queue (i.e., at a tail of the request queue) of the storage node identified in block 504. In block 554, the proxy computing node 106 determines whether the requested chunk was received. If not, the method 500 loops back to block 554 to continue to determine whether the requested chunk was received. Otherwise, the method 500 branches to block 526, wherein, as described previously, the timer is stopped.

EXAMPLES

Illustrative examples of the technologies disclosed herein are provided below. An embodiment of the technologies may include any one or more, and any combination of, the examples described below.

Example 1 includes a proxy computing node for managing data object requests in a storage node cluster, the proxy computing node comprising one or more processors; and one or more memory devices having stored therein a plurality of instructions that, when executed by the one or more processors, cause the proxy computing node to receive a data object request from a client computing node communicatively coupled to the proxy computing node, wherein the data object request identifies a data object stored at one of a plurality of storage nodes communicatively coupled to the proxy computing node; identify, based on the data object request, a storage node of the plurality of storage nodes on which the data object is stored; obtain a retrieval latency of the storage node, wherein the retrieval latency is indicative of a temporal latency for retrieving data from the storage node; determine whether to chunk the data object based on the retrieval latency of the storage node; determine, in response to a determination to chunk the data object, a chunk size of the data object to request from the storage node as a function of the retrieval latency, wherein the chunk size defines at least a portion of a total size of the data object; generate a chunk request to retrieve, from the storage node, the portion of the data object based on the chunk size; and transmit the chunk request to the storage node.

Example 2 includes the subject matter of Example 1, and wherein to retrieve the retrieval latency of the storage node comprises to retrieve a per-byte-latency of the storage node and a recent request latency of the storage node.

Example 3 includes the subject matter of any of Examples 1 and 2, and wherein to determine whether to chunk the data object based on the retrieval latency comprises to determine whether to chunk the data object based on the per-byte-latency, the recent request latency, the total size of the data object, and a chunk threshold.

Example 4 includes the subject matter of any of Examples 1-3, and wherein to determine the chunk size of the data object to request from the storage node comprises to determine the chunk size of the data object to request as a function of the per-byte-latency and the recent request latency.

Example 5 includes the subject matter of any of Examples 1-4, and wherein the plurality of instructions further cause the proxy computing node to determine, subsequent to having transmitted the chunk request to the storage node, whether the requested chunk was received from the storage node; and determine a request completion time based on a duration of time between having transmitted the chunk request and having received the requested chunk.

Example 6 includes the subject matter of any of Examples 1-5, and wherein the plurality of instructions further cause the proxy computing node to calculate an updated per-byte-latency for the data object request as a function of a weighted parameter, the request completion time, the total size of the data object, and a last calculated per-byte-latency of the storage node, wherein the weighted parameter defines a value between 0 and 1 that is configured to adjust an influence of previously calculated request latencies.

Example 7 includes the subject matter of any of Examples 1-6, and wherein the plurality of instructions further cause the proxy computing node to calculate an updated recent request latency for the data object request as a function of the weighted parameter, the request completion time, and a last calculated recent request latency of the storage node.

Example 8 includes the subject matter of any of Examples 1-7, and wherein to determine the request completion time comprises to (i) start, prior to transmission of the chunk request to the storage node, a timer of the proxy computing node, (ii) stop, in response to a determination that the requested chunk was received, the timer, and (iii) determine the request completion time based on a value of the timer.

Example 9 includes the subject matter of any of Examples 1-8, and wherein the plurality of instructions further cause the proxy computing node to determine a remaining size of the data object at the storage node after the portion of the data object corresponding to the chunk request is received; generate a data object remainder request based on the remaining size; and place the data object remainder request at a tail of a request queue of the proxy computing node, wherein the request queue defines a queue of data object requests that correspond to the storage node from which the data object is to be retrieved.

Example 10 includes the subject matter of any of Examples 1-9, and wherein the plurality of instructions further cause the proxy computing node to place the data object request at a tail of a request queue of the proxy computing node, wherein the request queue defines a queue of data object requests that correspond to the storage node from which the data object is to be retrieved; and determine whether the data object request is at a head of the request queue, wherein to retrieve the retrieval latency of the storage node comprises to retrieve the retrieval latency of the storage node subsequent to a determination that the data object request is at the head of the request queue.

Example 11 includes the subject matter of any of Examples 1-10, and wherein to identify the storage node comprises to identify the storage node based at least in part on an identifier of the data object request.

Example 12 includes a method for reducing latency variation of stored data object requests, the method comprising receiving, by a proxy computing node, a data object request from a client computing node communicatively coupled to the proxy computing node, wherein the data object request identifies a data object stored at one of a plurality of storage nodes communicatively coupled to the proxy computing node; identifying, by the proxy computing node and based on the data object request, a storage node of the plurality of storage nodes on which the data object is stored; obtaining, by the proxy computing node, a retrieval latency of the storage node, wherein the retrieval latency is indicative of a temporal latency for retrieving data from the storage node; determining, by the proxy computing node, whether to chunk the data object based on the retrieval latency of the storage node; determining, by the proxy computing node and in response to a determination to chunk the data object, a chunk size of the data object to request from the storage node as a function of the retrieval latency of the storage node, wherein the chunk size defines a portion of a total size of the data object; generating, by the proxy computing node, a chunk request to retrieve, from the storage node, the portion of the data object based on the chunk size; and transmitting, by the proxy computing node, the chunk request to the storage node.

Example 13 includes the subject matter of Example 12, and wherein retrieving the retrieval latency of the storage node comprises retrieving a per-byte-latency of the storage node and a recent request latency of the storage node.

Example 14 includes the subject matter of any of Examples 12 and 13, and wherein determining whether to chunk the data object based on the retrieval latency comprises determining whether to chunk the data object based on the per-byte-latency, the recent request latency, the total size of the data object, and a chunk threshold.

Example 15 includes the subject matter of any of Examples 12-14, and wherein determining the chunk size of the data object to request from the storage node comprises determining the chunk size of the data object to request as a function of the per-byte-latency and the recent request latency.

Example 16 includes the subject matter of any of Examples 12-15, and further including determining, by the proxy computing node and subsequent to transmitting the chunk request to the storage node, whether the requested chunk was received from the storage node; and determining a request completion time based on a duration of time between transmitting the chunk request and receiving the requested chunk.

Example 17 includes the subject matter of any of Examples 12-16, and further including calculating an updated per-byte-latency for the storage node as a function of a weighted parameter, the request completion time, the total size of the data object, and a last calculated per-byte-latency of the storage node, wherein the weighted parameter defines a value between 0 and 1 that is configured to adjust an influence of previously calculated request latencies.

Example 18 includes the subject matter of any of Examples 12-17, and further including calculating an updated recent request latency for the storage node as a function of the weighted parameter, the request completion time, and a last calculated recent request latency of the storage node.

Example 19 includes the subject matter of any of Examples 12-18, and wherein determining the request completion time comprises (i) starting, prior to transmitting the chunk request to the storage node, a timer of the proxy computing node, (ii) stopping, in response to a determination that the requested chunk was received, the timer, and (iii) determining the request completion time based on a value of the timer.

Example 20 includes the subject matter of any of Examples 12-19, and further including determining, by the proxy computing node, a remaining size of the data object at the storage node after the portion of the data object corresponding to the chunk request is received; generating, by the proxy computing node, a data object remainder request based on the remaining size; and placing, by the proxy computing node, the data object remainder request at a tail of a request queue of the proxy computing node, wherein the request queue defines a queue of data object requests that correspond to the storage node from which the data object is to be retrieved.

Example 21 includes the subject matter of any of Examples 12-20, and further including placing, by the proxy computing node, the data object request at a tail of a request queue of the proxy computing node, wherein the request queue defines a queue of data object requests that correspond to the storage node from which the data object is to be retrieved; and determining, by the proxy computing node, whether the data object request is at a head of the request queue, wherein retrieving the retrieval latency of the storage node comprises retrieving the retrieval latency of the storage node subsequent to a determination that the data object request is at the head of the request queue.

Example 22 includes the subject matter of any of Examples 12-21, and wherein identifying the storage node comprises identifying the storage node based at least in part on an identifier of the data object request.

Example 23 includes a computing device comprising a processor; and a memory having stored therein a plurality of instructions that when executed by the processor cause the computing device to perform the method of any of Examples 12-22.

Example 24 includes one or more machine readable storage media comprising a plurality of instructions stored thereon that in response to being executed result in a computing device performing the method of any of Examples 12-22.

Example 25 includes a proxy computing node for reducing latency variation of stored data object requests, the proxy computing node comprising network communication circuitry to receive a data object request from a client computing node communicatively coupled to the proxy computing node, wherein the data object request identifies a data object stored at one of a plurality of storage nodes communicatively coupled to the proxy computing node; storage node identification circuitry to identify, based on the data object request, a storage node of the plurality of storage nodes on which the data object is stored; latency determination circuitry to obtain a retrieval latency of the storage node, wherein the retrieval latency is indicative of a temporal latency for retrieving data from the storage node; data object chunk determination circuitry to (i) determine whether to chunk the data object based on the retrieval latency of the storage node and (ii) determine, in response to a determination to chunk the data object, a chunk size of the data object to request from the storage node as a function of the retrieval latency, wherein the chunk size defines at least a portion of a total size of the data object; data object request management circuitry to generate a chunk request to retrieve, from the storage node, the portion of the data object based on the chunk size; and wherein the network communication circuitry is further to transmit the chunk request to the storage node.

Example 26 includes the subject matter of Example 25, and wherein to retrieve the retrieval latency of the storage node comprises to retrieve a per-byte-latency of the storage node and a recent request latency of the storage node.

Example 27 includes the subject matter of any of Examples 25 and 26, and wherein to determine whether to chunk the data object based on the retrieval latency comprises to determine whether to chunk the data object based on the per-byte-latency, the recent request latency, the total size of the data object, and a chunk threshold.

Example 28 includes the subject matter of any of Examples 25-27, and wherein to determine the chunk size of the data object to request from the storage node comprises to determine the chunk size of the data object to request as a function of the per-byte-latency and the recent request latency.

Example 29 includes the subject matter of any of Examples 25-28, and wherein the data object request management circuitry is further to determine, subsequent to having transmitted the chunk request to the storage node, whether the requested chunk was received from the storage node, and wherein the latency determination circuitry is further to determine a request completion time based on a duration of time between having transmitted the chunk request and having received the requested chunk.

Example 30 includes the subject matter of any of Examples 25-29, and wherein the latency determination circuitry is further to calculate an updated per-byte-latency for the data object request as a function of a weighted parameter, the request completion time, the total size of the data object, and a last calculated per-byte-latency of the storage node, wherein the weighted parameter defines a value between 0 and 1 that is configured to adjust an influence of previously calculated request latencies.

Example 31 includes the subject matter of any of Examples 25-30, and wherein the latency determination circuitry is further to calculate an updated recent request latency for the data object request as a function of the weighted parameter, the request completion time, and a last calculated recent request latency of the storage node.

Example 32 includes the subject matter of any of Examples 25-31, and wherein to determine the request completion time comprises to (i) start, prior to transmission of the chunk request to the storage node, a timer of the proxy computing node, (ii) stop, in response to a determination that the requested chunk was received, the timer, and (iii) determine the request completion time based on a value of the timer.

Example 33 includes the subject matter of any of Examples 25-32, and wherein the data object chunk determination circuitry is further to (i) determine a remaining size of the data object at the storage node after the portion of the data object corresponding to the chunk request is received and (ii) generate a data object remainder request based on the remaining size, and wherein the data object request management circuitry is further to place the data object remainder request at a tail of a request queue of the proxy computing node, wherein the request queue defines a queue of data object requests that correspond to the storage node from which the data object is to be retrieved.

Example 34 includes the subject matter of any of Examples 25-33, and wherein the data object request management circuitry is further to (i) place the data object request at a tail of a request queue of the proxy computing node, wherein the request queue defines a queue of data object requests that correspond to the storage node from which the data object is to be retrieved and (ii) determine whether the data object request is at a head of the request queue, wherein to retrieve the retrieval latency of the storage node comprises to retrieve the retrieval latency of the storage node subsequent to a determination that the data object request is at the head of the request queue.

Example 35 includes the subject matter of any of Examples 25-34, and wherein to identify the storage node comprises to identify the storage node based on an identifier of the data object request.

Example 36 includes a proxy computing node for managing data object requests in a storage node cluster, the proxy computing node comprising network communication circuitry to receive a data object request from a client computing node communicatively coupled to the proxy computing node, wherein the data object request identifies a data object stored at one of a plurality of storage nodes communicatively coupled to the proxy computing node; means for identifying, based on the data object request, a storage node of the plurality of storage nodes on which the data object is stored; means for obtaining a retrieval latency of the storage node, wherein the retrieval latency is indicative of a temporal latency for retrieving data from the storage node; means for determining whether to chunk the data object based on the retrieval latency of the storage node; means for determining, in response to a determination to chunk the data object, a chunk size of the data object to request from the storage node as a function of the retrieval latency of the storage node, wherein the chunk size defines a portion of a total size of the data object; and means for generating a chunk request to retrieve, from the storage node, the portion of the data object based on the chunk size, wherein the network communication circuitry is further to transmit the chunk request to the storage node.

Example 37 includes the subject matter of Example 36, and wherein the means for retrieving the retrieval latency of the storage node comprises means for retrieving a per-byte-latency of the storage node and a recent request latency of the storage node.

Example 38 includes the subject matter of any of Examples 36 and 37, and wherein the means for determining whether to chunk the data object based on the retrieval latency comprises means for determining whether to chunk the data object based on the per-byte-latency, the recent request latency, the total size of the data object, and a chunk threshold.

Example 39 includes the subject matter of any of Examples 36-38, and wherein the means for determining the chunk size of the data object to request from the storage node comprises means for determining the chunk size of the data object to request as a function of the per-byte-latency and the recent request latency.

Example 40 includes the subject matter of any of Examples 36-39, and further including means for determining, subsequent to transmitting the chunk request to the storage node, whether the requested chunk was received from the storage node; and means for determining a request completion time based on a duration of time between transmitting the chunk request and receiving the requested chunk.

Example 41 includes the subject matter of any of Examples 36-40, and further including means for calculating an updated per-byte-latency for the storage node as a function of a weighted parameter, the request completion time, the total size of the data object, and a last calculated per-byte-latency of the storage node, wherein the weighted parameter defines a value between 0 and 1 that is configured to adjust an influence of previously calculated request latencies.

Example 42 includes the subject matter of any of Examples 36-41, and further including means for calculating an updated recent request latency for the storage node as a function of the weighted parameter, the request completion time, and a last calculated recent request latency of the storage node.

Example 43 includes the subject matter of any of Examples 36-42, and wherein the means for determining the request completion time comprises means for (i) starting, prior to transmitting the chunk request to the storage node, a timer of the proxy computing node, (ii) stopping, in response to a determination that the requested chunk was received, the timer, and (iii) determining the request completion time based on a value of the timer.

Example 44 includes the subject matter of any of Examples 36-43, and further including means for determining a remaining size of the data object at the storage node after the portion of the data object corresponding to the chunk request is received; means for generating a data object remainder request based on the remaining size; and means for placing the data object remainder request at a tail of a request queue of the proxy computing node, wherein the request queue defines a queue of data object requests that correspond to the storage node from which the data object is to be retrieved.

Example 45 includes the subject matter of any of Examples 36-44, and further including means for placing the data object request at a tail of a request queue of the proxy computing node, wherein the request queue defines a queue of data object requests that correspond to the storage node from which the data object is to be retrieved; and means for determining whether the data object request is at a head of the request queue, wherein the means for retrieving the retrieval latency of the storage node comprises means for retrieving the retrieval latency of the storage node subsequent to a determination that the data object request is at the head of the request queue.

Example 46 includes the subject matter of any of Examples 36-45, and wherein the means for identifying the storage node comprises means for identifying the storage node based on an identifier of the data object request.

The invention claimed is:

1. A proxy computing node for managing data object requests in a storage node cluster, the proxy computing node comprising:
one or more processors; and
one or more data storage devices having stored therein a plurality of instructions that, when executed by the one or more processors, cause the proxy computing node to:
receive a data object request from a client computing node, wherein the data object request identifies a data object;
identify, based on the data object request, a storage node of a plurality of storage nodes on which the data object is stored;
obtain an exponentially weighted moving value indicative of a latency of the storage node, wherein the latency is indicative of a temporal latency for retrieving data from the storage node, and wherein the exponentially weighted moving value is indicative of a per-byte-latency of the storage node and the exponentially weighted moving value is indicative of a recent request latency of the storage node;
determine whether to chunk the data object based on the exponentially weighted moving value of the storage node, wherein to determine whether to chunk the data object comprises to determine whether a first product of the per-byte latency and a total size of the data object is greater than a second product of the recent request latency and a predetermined chunk trigger value;
determine, in response to a determination to chunk the data object, a chunk size of the data object to request from the storage node as a function of the exponentially weighted moving value;
generate a chunk request to retrieve, from the storage node, the portion of the data object based on the chunk size; and
transmit the chunk request to the storage node.

2. The proxy computing node of claim 1, wherein the plurality of instructions further cause the proxy computing node to:

determine, subsequent to having transmitted the chunk request to the storage node, whether the requested chunk was received from the storage node; and determine a request completion time based on a duration of time between having transmitted the chunk request and having received the requested chunk.

3. The proxy computing node of claim 2, wherein the plurality of instructions further cause the proxy computing node to calculate an updated per-byte-latency for the data object request as a function of a weighted parameter, the request completion time, the total size of the data object, and a last calculated per-byte-latency of the storage node, wherein the weighted parameter defines a value between 0 and 1 that is configured to adjust an influence of previously calculated request latencies.

4. The proxy computing node of claim 2, wherein to determine the request completion time comprises to (i) start, prior to transmission of the chunk request to the storage node, a timer of the proxy computing node, (ii) stop, in response to a determination that the requested chunk was received, the timer, and (iii) determine the request completion time based on a value of the timer.

5. The proxy computing node of claim 1, wherein the plurality of instructions further cause the proxy computing node to:

determine a remaining size of the data object at the storage node after the portion of the data object corresponding to the chunk request is received;

generate a data object remainder request based on the remaining size; and place the data object remainder request at a tail of a request queue of the proxy computing node, wherein the request queue defines a queue of data object requests that correspond to the storage node from which the data object is to be retrieved.

6. The proxy computing node of claim 1, wherein the plurality of instructions further cause the proxy computing node to:

place the data object request at a tail of a request queue of the proxy computing node, wherein the request queue defines a queue of data object requests that correspond to the storage node from which the data object is to be retrieved; and determine whether the data object request is at a head of the request queue, wherein to obtain the exponentially weighted moving value of the storage node comprises to obtain the exponentially weighted moving value of the storage node subsequent to a determination that the data object request is at the head of the request queue.

7. One or more non-transitory, computer-readable storage media comprising a plurality of instructions stored thereon that in response to being executed cause the proxy computing node to:

receive a data object request from a client computing node, wherein the data object request identifies a data object;

identify, based on the data object request, a storage node of a plurality of storage nodes on which the data object is stored;

obtain an exponentially weighted moving value indicative of a latency of the storage node, wherein the latency is indicative of a temporal latency for retrieving data from the storage node and wherein the exponentially weighted moving value is indicative of a per-byte-latency of the storage node and the exponentially weighted moving value is indicative of a recent request latency of the storage node;

determine whether to chunk the data object based on the exponentially weighted moving value of the storage node, wherein to determine whether to chunk the data object comprises to determine whether a first product of the per-byte latency and a total size of the data object is greater than a second product of the recent request latency and a predetermined chunk trigger value;

determine, in response to a determination to chunk the data object, a chunk size of the data object to request from the storage node as a function of the exponentially weighted moving value;

generate a chunk request to retrieve, from the storage node, the portion of the data object based on the chunk size; and transmit the chunk request to the storage node.

8. The one or more non-transitory, computer-readable storage media of claim 7, wherein the plurality of instructions further cause the proxy computing node to:

determine, subsequent to having transmitted the chunk request to the storage node, whether the requested chunk was received from the storage node; and determine a request completion time based on a duration of time between having transmitted the chunk request and having received the requested chunk.

9. The one or more non-transitory, computer-readable storage media of claim 8, wherein the plurality of instructions further cause the proxy computing node to calculate an updated per-byte-latency for the data object request as a function of a weighted parameter, the request completion time, the total size of the data object, and a last calculated per-byte-latency of the storage node, wherein the weighted parameter defines a value between 0 and 1 that is configured to adjust an influence of previously calculated request latencies.

10. The one or more non-transitory, computer-readable storage media of claim 8, wherein to determine the request completion time comprises to (i) start, prior to transmission of the chunk request to the storage node, a timer of the proxy computing node, (ii) stop, in response to a determination that the requested chunk was received, the timer, and (iii) determine the request completion time based on a value of the timer.

11. The one or more non-transitory, computer-readable storage media of claim 7, wherein the plurality of instructions further cause the proxy computing node to:

determine a remaining size of the data object at the storage node after the portion of the data object corresponding to the chunk request is received;

generate a data object remainder request based on the remaining size; and place the data object remainder request at a tail of a request queue of the proxy computing node, wherein the request queue defines a queue of data object requests that correspond to the storage node from which the data object is to be retrieved.

12. The one or more non-transitory, computer-readable storage media of claim 7, wherein the plurality of instructions further cause the proxy computing node to:

place the data object request at a tail of a request queue of the proxy computing node, wherein the request queue defines a queue of data object requests that correspond to the storage node from which the data object is to be retrieved; and determine whether the data object request is at a head of the request queue, wherein to retrieve the exponentially weighted moving value of the storage node comprises to retrieve the exponentially weighted moving value of the storage node subsequent to a determination that the data object request is at the head of the request queue.

13. A method for reducing latency variation of stored data object requests, the method comprising:

receiving, by a proxy computing node, a data object request from a client computing node, wherein the data object request identifies a data object;

identifying, by the proxy computing node and based on the data object request, a storage node of a plurality of storage nodes on which the data object is stored;

obtaining, by the proxy computing node, an exponentially weighted moving value indicative of a latency of the storage node, wherein the latency is indicative of a temporal latency for retrieving data from the storage node, and wherein the exponentially weighted moving value is indicative of a per-byte-latency of the storage node and the exponentially weighted moving value is indicative of a recent request latency of the storage node;

determining, by the proxy computing node, whether to chunk the data object based on the exponentially weighted moving value of the storage node, wherein determining whether to chunk the data object comprises determining whether a first product of the per-byte latency and a total size of the data object is greater than a second product of the recent request latency and a predetermined chunk trigger value;

determining, by the proxy computing node and in response to a determination to chunk the data object, a chunk size of the data object to request from the storage node as a function of the exponentially weighted moving value of the storage node, wherein the chunk size defines a portion of a total size of the data object;

generating, by the proxy computing node, a chunk request to retrieve, from the storage node, the portion of the data object based on the chunk size; and transmitting, by the proxy computing node, the chunk request to the storage node.

14. The method of claim 13, wherein:
determining the chunk size of the data object to request from the storage node comprises determining the chunk size of the data object to request as a function of the per-byte-latency and the recent request latency.

15. The method of claim 13, further comprising:
determining, by the proxy computing node and subsequent to transmitting the chunk request to the storage node, whether the requested chunk was received from the storage node;

determining a request completion time based on a duration of time between transmitting the chunk request and receiving the requested chunk; and calculating an updated per-byte-latency for the storage node as a function of a weighted parameter, the request completion time, the total size of the data object, and a last calculated per-byte-latency of the storage node, wherein the weighted parameter defines a value between 0 and 1 that is configured to adjust an influence of previously calculated request latencies.

16. The method of claim 13, further comprising:
determining, by the proxy computing node, a remaining size of the data object at the storage node after the portion of the data object corresponding to the chunk request is received;

generating, by the proxy computing node, a data object remainder request based on the remaining size; and placing, by the proxy computing node, the data object remainder request at a tail of a request queue of the proxy computing node, wherein the request queue defines a queue of data object requests that correspond to the storage node from which the data object is to be retrieved.

17. The method of claim 13, further comprising:
placing, by the proxy computing node, the data object request at a tail of a request queue of the proxy computing node, wherein the request queue defines a queue of data object requests that correspond to the storage node from which the data object is to be retrieved; and determining, by the proxy computing node, whether the data object request is at a head of the request queue, wherein retrieving the exponentially weighted moving value of the storage node comprises retrieving the exponentially weighted moving value of the storage node subsequent to a determination that the data object request is at the head of the request queue.

18. A proxy computing node for managing data object requests in a storage node cluster, the proxy computing node comprising:

network communication circuitry to receive a data object request from a client computing node, wherein the data object request identifies a data object;

storage node identification circuitry to identify, based on the data object request, a storage node of a plurality of storage nodes on which the data object is stored;

means for obtaining an exponentially weighted moving value indicative of a latency of the storage node, wherein the exponentially weighted moving value is indicative of a per-byte-latency of the storage node and the exponentially weighted moving value is indicative of a recent request latency of the storage node;

means for determining whether to chunk the data object based on the exponentially weighted moving value of the storage node, wherein the means for determining whether to chunk the data object comprises means for determining whether a first product of the per-byte latency and a total size of the data object is greater than a second product of the recent request latency and a predetermined chunk trigger value;

means for determining, in response to a determination to chunk the data object, a chunk size of the data object to request from the storage node as a function of the exponentially weighted moving value of the storage node, wherein the chunk size defines a portion of a total size of the data object; and means for generating a chunk request to retrieve, from the storage node, the portion of the data object based on the chunk size, wherein the network communication circuitry is further to transmit the chunk request to the storage node.

19. The proxy computing node of claim 18, wherein the means for determining the chunk size of the data object to request from the storage node comprises means for determining the chunk size of the data object to request as a function of the per-byte-latency and the recent request latency.

* * * * *